(12) United States Patent
Yoo et al.

(10) Patent No.: US 7,573,556 B2
(45) Date of Patent: Aug. 11, 2009

(54) IN-PLANE SWITCHING MODE LIQUID CRYSTAL DISPLAY DEVICE AND METHOD OF MANUFACTURING THE SAME

(75) Inventors: Soon Sung Yoo, Gyeonggi-do (KR); Heung Lyul Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 484 days.

(21) Appl. No.: 11/477,385

(22) Filed: Jun. 30, 2006

(65) Prior Publication Data
US 2007/0002250 A1 Jan. 4, 2007

(30) Foreign Application Priority Data
Jun. 30, 2005 (KR) .................. 10-2005-0058426

(51) Int. Cl.
*G02F 1/1343* (2006.01)
(52) U.S. Cl. ..................................... 349/141
(58) Field of Classification Search .................. 349/141
See application file for complete search history.

(56) References Cited
U.S. PATENT DOCUMENTS
7,256,851 B2 * 8/2007 Park .......................... 349/141
7,362,400 B2 * 4/2008 Itou et al. ................... 349/141

* cited by examiner

*Primary Examiner*—Kevin S Wood
(74) *Attorney, Agent, or Firm*—Morgan, Lewis & Bockius LPP

(57) ABSTRACT

A method of manufacturing an in-plane switching mode liquid crystal display device includes forming an insulation layer on a substrate, patterning a resist layer on the insulation layer, etching the insulation layer to form an insulation layer pattern having tapered edges, forming electrode layers on exposed surfaces of the substrate, the tapered edges, and the resist layer, etching the electrode layers formed on the exposed surfaces and on the resist layer, and removing the resist layer to form the common electrode and the pixel electrode with slopes and that are arranged parallel to each other on the tapered edges of the insulation layer. The common electrode and the pixel electrode each have a width less than 1 μm, which increases aperture ratio and transmittance.

14 Claims, 12 Drawing Sheets

IN-PLANE SWITCHING MODE LIQUID CRYSTAL DISPLAY DEVICE AND METHOD OF MANUFACTURING THE SAME

This application claims the benefit of Korean Patent Application No. P2005-0058426, filed in Korea on Jun. 30, 2005, which is hereby incorporated by reference.

BACKGROUND OF THE INVENTION

1. Field of the Invention

The present invention relates to a liquid crystal display (LCD) device, and more particularly, to an In-Plane Switching (IPS) mode LCD device and a method of manufacturing the same, which are capable of increasing an aperture ratio.

2. Background of the Related Art

Recently, flat panel display devices have attracted considerable attention because they have screens with thicknesses of only a few centimeters. Among them, an LCD device is widely utilized for laptop computers, monitors, aircraft, etc. The LCD typically includes a lower substrate, an upper substrate, and a liquid crystal layer interposed between the lower and upper substrates. When a voltage is applied to the liquid crystal layer, arrangement of liquid crystal cells of the liquid crystal layer is changed and transmittance of light according to the changes is adjusted, thereby displaying images.

Hereinafter, a conventional LCD device will be described in detail with reference to the accompanying drawings. FIGS. 1A and 1B are perspective views schematically illustrating a twisted nematic (TN) mode LCD device according to the related art. Specifically, FIG. 1A illustrates a state of the related art TN mode LCD device to which a voltage is not applied, and FIG. 1B illustrates a state of the related art TN mode LCD device to which a voltage is applied.

As shown in FIGS. 1A and 1B, the related art TN mode LCD device includes a first substrate 1, a second substrate 3, and a liquid crystal layer 5 interposed between the first and second substrates 1 and 3. The first substrate 1 further includes a first polarizing plate 7 that is arranged on an outer surface of the first substrate 1 and has a transmission axis oriented to a predetermined direction. The second substrate 3 further includes a second polarizing plate 9 that is arranged on an outer surface of the second substrate 3 and has a transmission axis opposite to that of the first polarizing plate 7. Moreover, although not shown in the drawings, the first substrate 1 includes a pixel electrode and the second substrate 3 includes a common electrode, to thereby generate a vertical directional electric field between the pixel electrode and the common electrode.

Referring to FIG. 1A, when a voltage is not applied, the liquid crystal layer 5 is twisted by 90 degrees between the first substrate 1 and the second substrate 3. Herein, when light 10 enters through the second polarizing plate 9, the light 10 passes through the liquid crystal layer 5. At this time, like molecules of the liquid crystal layer 5 that are twisted by 90 degrees, the light 10 is also twisted by 90 degrees to pass through the first polarizing plate 7, thereby displaying a white image. On the other hand, referring to FIG. 1B, when a voltage is applied, the molecules of the liquid crystal layer 5 are vertically arranged between the first and second substrates 1 and 3 by the vertical directional electric field between the pixel electrode and the common electrode. Herein, when the light 10 enters through the second polarizing plate 9, the light 10 passes through the liquid crystal layer 5. At this time, since a polarizing direction of the light 10 does not rotate, the light 10 cannot pass through the first polarizing plate 7, thereby displaying a black image.

However, the related art TN mode LCD device has a narrow viewing angle. FIGS. 2A to 2C are schematic views illustrating the narrow viewing angle of the TN mode LCD device according to the related art. Specifically, FIG. 2A illustrates a white displaying state in which a voltage is not applied, FIG. 2B illustrates a black displaying state in which a full voltage is applied, and FIG. 2C illustrates an intermediate displaying state in which an intermediate voltage is applied.

As shown in FIG. 2A, when the voltage is not applied, the molecules of the liquid crystal layer 5 are twisted by a minute angle in the same direction and the incident light (depicted by arrows in the drawing) is displayed as white light in all directions. Then, as shown in FIG. 2B, when the full voltage is applied, the molecules of the liquid crystal layer 5 are arranged in a vertical direction due to the effect of the electric field, and the incident light are not twisted. Thus, the black displaying state is shown. Moreover, as shown in FIG. 2C, when the intermediate voltage is applied, the molecules of the liquid crystal layer 5 are arranged in a slant direction, and the displayed states are different according to the directions of the incident light. In other words, the light entered in the direction from right lower side to the left upper side displays black because the polarizing direction of the light is not changed, whereas the light entered in the direction from the left lower side to the right upper side is displayed as white because the polarizing direction of the light is twisted. As described above, a problem with the related art TN mode LCD device is that the displaying state varies depending on the incident angle of the light, and thus the viewing angle is narrow.

For this reason, methods to widen the viewing angle have been researched and developed. One proposal is an IPS mode using a horizontal directional electric field, a vertical alignment (VA) mode using a vertical arranged layer, and an electrically controlled birefringence (ECB) mode. Other proposals are a multi-domain method of dividing a domain and using a mean value of the arrangement of the molecules of the liquid crystal layer, and a phase compensation method of using a phase difference film to change phase difference according to the change of the viewing angle. Hereinafter a related art IPS mode LCD device will be described.

FIGS. 3A to 3D illustrate the related art IPS mode LCD device. Specifically, FIGS. 3A and 3B are a sectional view and a plan view schematically illustrating the related art IPS mode LCD device to which a voltage is not applied, whereas FIGS. 3C and 3D are a sectional view and a plan view schematically illustrating the related art IPS mode LCD device to which a voltage is applied.

As shown in FIGS. 3A and 3B, the related art IPS mode LCD device includes a first substrate 1, a second substrate 3, and a liquid crystal layer 5 interposed between the first and second substrates 1 and 3. The first substrate 1 further includes a first polarizing plate 7 that is arranged on an outer surface of the first substrate 1 and has a transmission axis oriented to a predetermined direction. The second substrate 3 further includes a second polarizing plate 9 that is arranged on an outer surface of the second substrate 3 and has a transmission axis opposite to that of the first polarizing plate 7. Moreover, the first substrate 1 includes a pixel electrode 2 and a common electrode 4 parallel to each other to thereby generate a horizontal directional electric field between the pixel electrode 2 and the common electrode 4. Referring to FIGS. 3A and 3B, when a voltage is not applied, the liquid crystal layer 5 is arranged between the first and second substrates I and 3, and is approximately parallel to the longitudinal direction of the two electrodes 2 and 4. Herein, when the light 10 (of FIG. 1A) enters through the first polarizing plate 7, the light 10 transmits the liquid crystal layer 5. At this time, since the polarizing direction of the light 10 does not rotate, the light 10 cannot pass through the second polarizing plate 9 having the transmission axis opposite to the transmission axis of the first polarizing plate 7. Thus, a black image is displayed.

As shown in FIGS. 3C and 3D, when a voltage is applied, the liquid crystal layer 5 is arranged differently between the vicinity of the first substrate 1 and the vicinity of the second substrate 3. Specifically, due to the horizontal directional electric field between the pixel electrode 2 and the common electrode 4, part of the liquid crystal layer 5, which is located in the vicinity of the first substrate 1, is perpendicular to a longitudinal direction of the pixel electrode 2 and the common electrode 4. On the other hand, part of the liquid crystal layer 5, which is located in the vicinity of the second substrate 3, is parallel to the longitudinal direction of the pixel electrode 2 and the common electrode 4, like the case when the voltage is not applied because the effect of the electric field is weak. Thus, when the light 10 (of FIG. 1A) enters through the first polarizing plate 7, the light 10 then passes through the liquid crystal layer 5. At this time, like the molecules of the liquid crystal layer 5, the light 10 is twisted and passes through the second polarizing plate 9 opposite to the first polarizing plate 7, thereby displaying a white image. As described above, in the related art IPS mode LCD device, since the molecules of the liquid crystal layer 5 are not erected vertically but switched horizontally, the viewing angle is not changed according to the incident angle of the light 10 even when the intermediate voltage is applied.

However, since the pixel electrode 2 and the common electrode 4 are both arranged on the first substrate 1, the related art IPS mode LCD device has a low transmittance. The low transmittance is caused due to the aperture ratio being decreased as much as widths of the pixel electrode 2 and the common electrode 4. Herein, the widths of the pixel electrode 2 and the common electrode 4 are about 4 μm, which is a minimum width capable of being formed by photolithography. When the photolithography is carried out, there is limitation to reduce the widths of the pixel electrode 2 and the common electrode 4 due to the characteristics of the photolithography.

SUMMARY OF THE INVENTION

Accordingly, the present invention is directed to an in-plane switching (IPS) mode liquid crystal display (LCD) device and a method of manufacturing the same that substantially obviate one or more problems due to limitations and disadvantages of the related art.

An object of the present invention is to provide a method of manufacturing an in-plane switching mode LCD device in which widths of a pixel electrode and a common electrode are remarkably reduced, thereby increasing an aperture ratio.

Another object of the present invention is to provide an in-plane switching mode LCD device in which widths of a pixel electrode and a common electrode are remarkably reduced, thereby increasing an aperture ratio.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims thereof as well as the appended drawings.

To achieve these objects and other advantages and in accordance with the purpose of the invention, as embodied and broadly described herein, a method of manufacturing an IPS mode LCD device includes the steps of (1) forming an insulation layer on a substrate, (2) depositing a resist layer on the insulation layer to pattern the resist layer with a predetermined shape, (3) etching the insulation layer using the patterned resist layer as a mask to form an insulation layer pattern having tapered edges, (4) forming electrode layers for a common electrode and a pixel electrode on exposed surfaces of the substrate, the tapered edges of the insulation layer pattern, and the upper side of the resist layer, (5) etching the electrode layers formed on the exposed surfaces of the substrate and the upper side of the resist layer, and (6) removing the resist layer to form the common electrode and the pixel electrode on the tapered edges of the insulation layer pattern, wherein the common electrode and the pixel electrode have predetermined slopes, respectively, and are arranged parallel to each other.

In another aspect of the present invention, an IPS mode LCD device includes a first substrate and a second substrate facing each other and respectively having pixel regions, a liquid crystal layer formed between the first and second substrates, an insulation layer formed in the pixel regions of the first substrate and including tapered edges, and a common electrode and a pixel electrode arranged on the tapered edges of the insulation layer, wherein the common electrode and the pixel electrode respectively have predetermined slopes and are arranged parallel to each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 2A to 2C are schematic views illustrating a narrow viewing angle in the twisted nematic mode LCD device according to the related art, wherein FIG. 2A illustrates a white display state in which a voltage is not applied, FIG. 2B illustrates a black display state in which a voltage is applied, and FIG. 2C illustrates an intermediate displaying state in which an intermediate voltage is applied;

FIGS. 3A to 3D are schematic views illustrating an IPS mode LCD device according to the related art, wherein FIGS. 3A and 3B are a sectional view and a plan view illustrating the related art IPS mode LCD device to which a voltage is not applied, and FIGS. 3C and 3D are a sectional view and a plan view illustrating the related art IPS mode LCD device to which a voltage is applied;

DETAILED DESCRIPTION OF THE PREFERRED EMBODIMENTS

Reference will now be made in detail to the preferred embodiments of an in-plane switching (IPS) mode liquid crystal display (LCD) device and a method of manufacturing the same of the present invention, examples of which are illustrated in the accompanying drawings.

FIGS. 4A to 4F are sectional views schematically illustrating a manufacturing process of an IPS mode LCD device according to a first exemplary embodiment of the present invention. The first exemplary embodiment only illustrates a process of forming a pixel electrode and a common electrode within a unit pixel region of the IPS mode LCD device. Other elements may be applied by various methods known in the art of the present invention and modifications thereof.

Figure 1A:
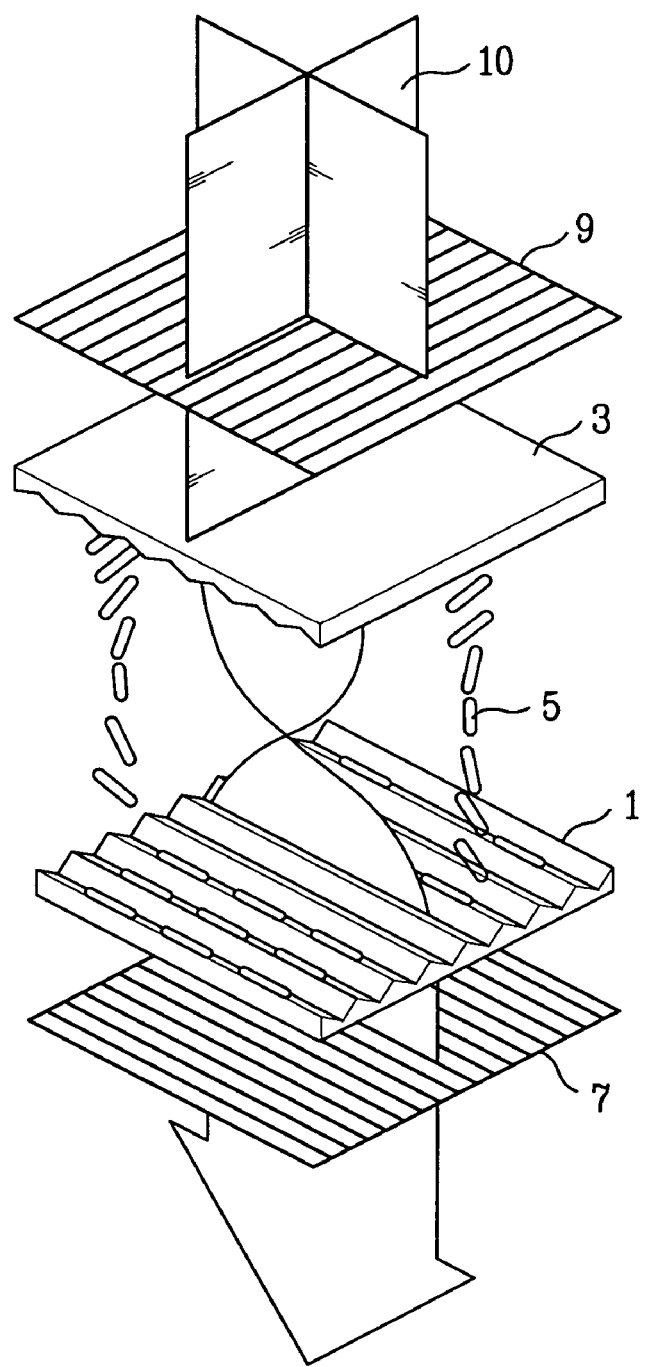
FIGS. 1A and 1B are schematic views respectively illustrating a twisted nematic mode LCD device to which a voltage is applied and the twisted nematic mode LCD device to which a voltage is not applied according to the related art.
Figure 1B:
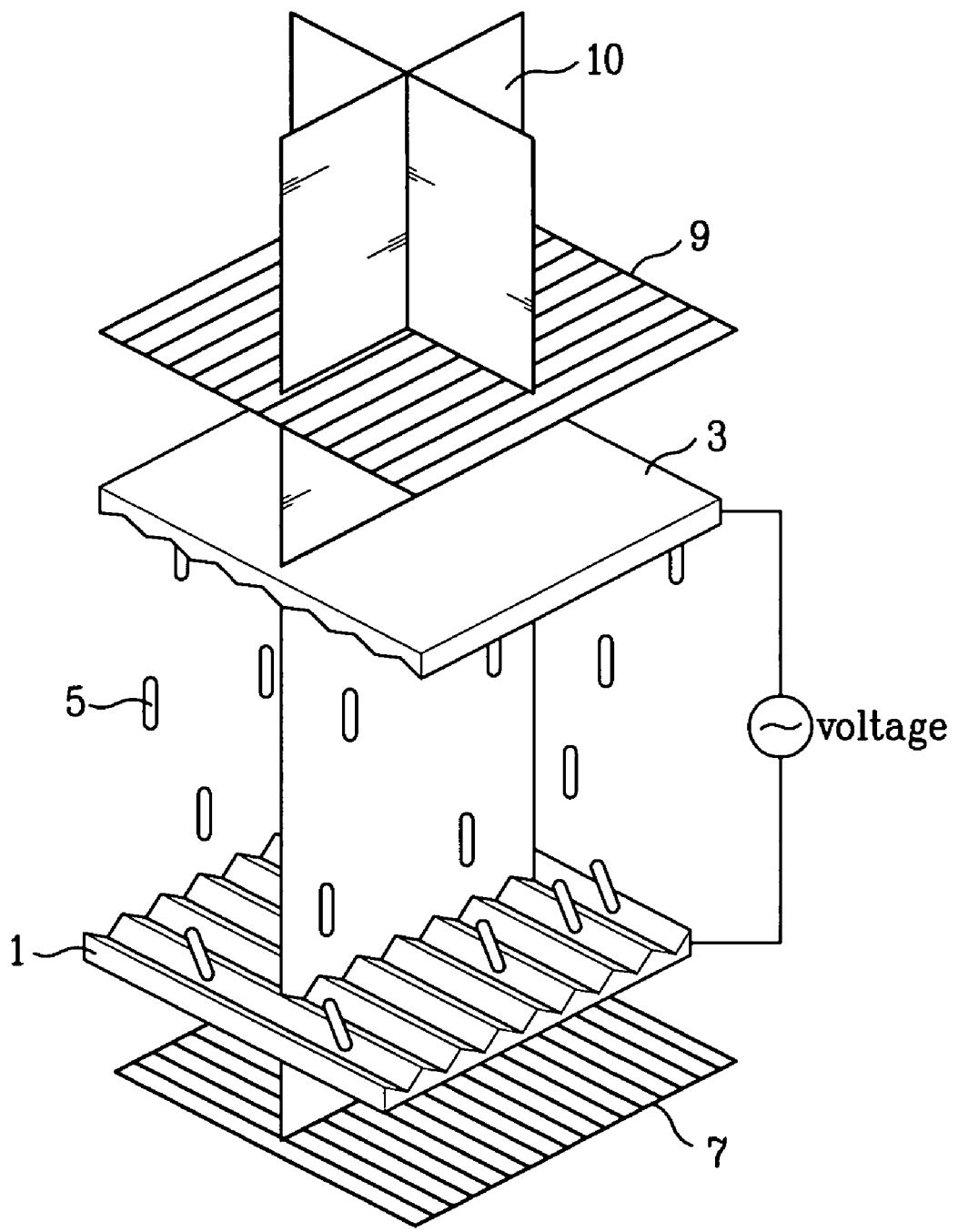
Figure 2A:
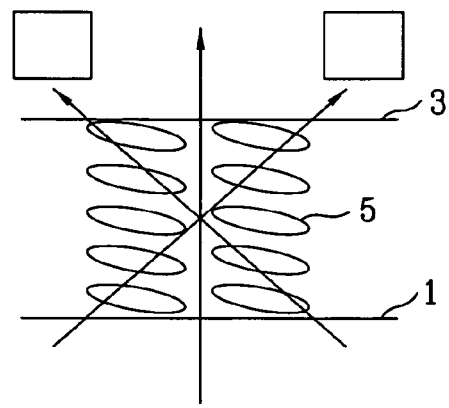
Figure 2B:
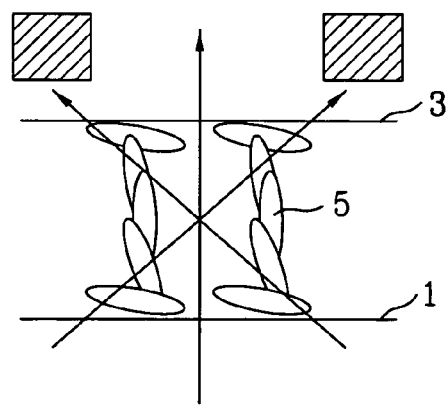
Figure 2C:
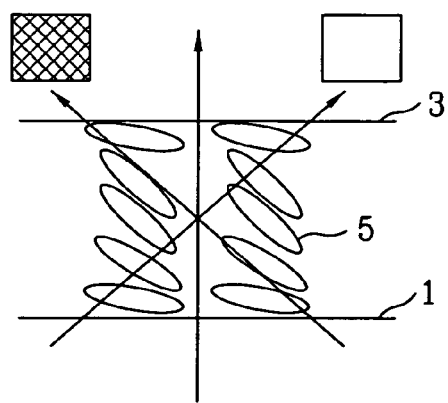
Figure 3A:
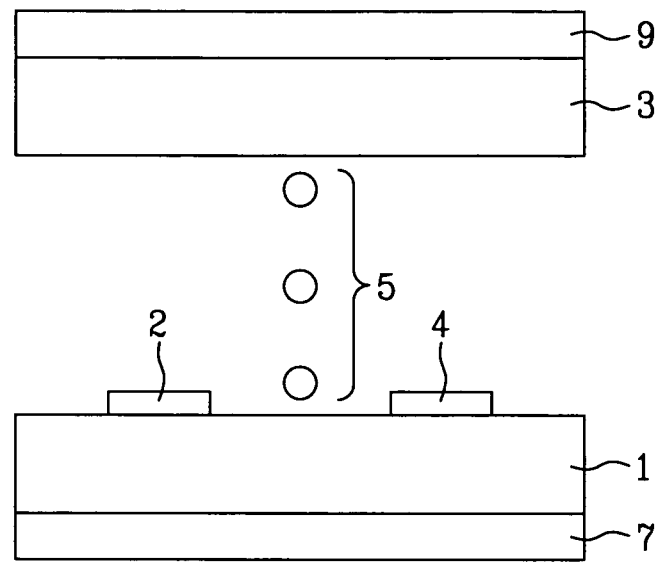
Figure 3B:
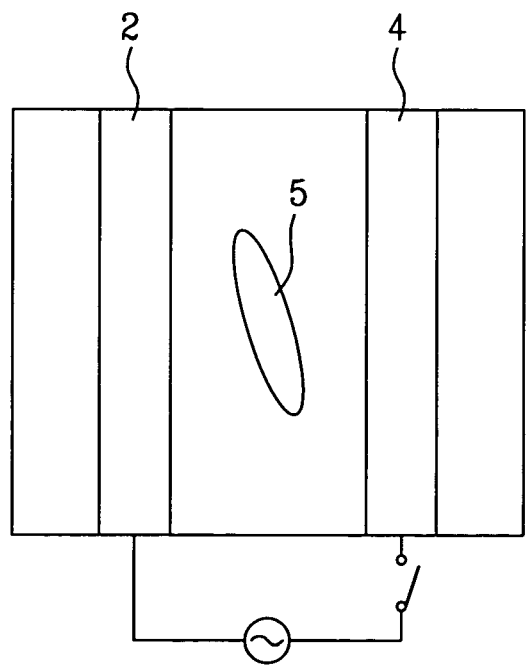
Figure 3C:
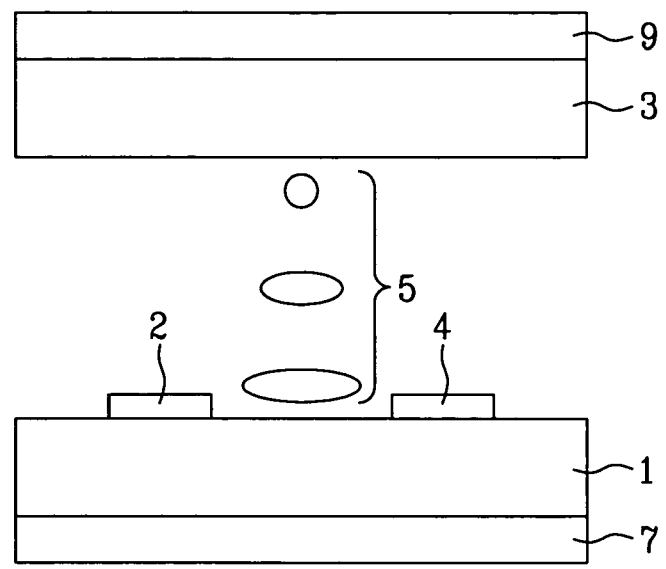
Figure 3D:
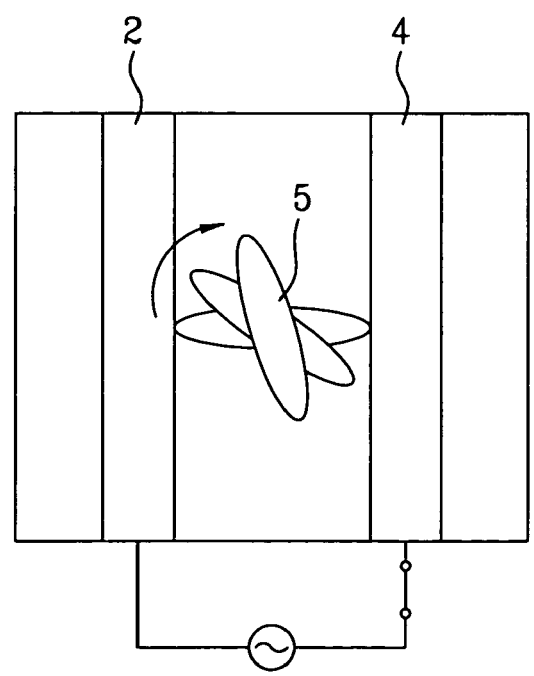
Figure 4A:
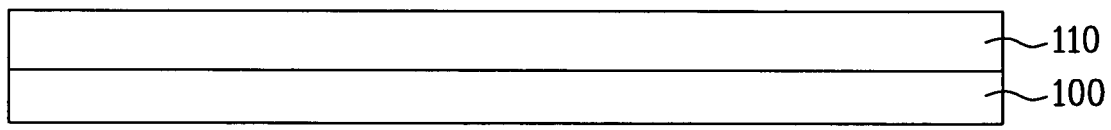
FIGS. 4A to 4F are sectional views schematically illustrating a manufacturing process of an IPS mode LCD device according to a first exemplary embodiment of the present invention.

As shown in FIG. 4A, a substrate 100 is prepared and an insulation layer 110 is formed on the substrate 100. The insulation layer 110 may be made of an inorganic material such as SiOx or SiNx, organic material such as benzocyclobutene or polyvinyl alcohol, or a dual layer of the inorganic material and the organic material. The insulation layer 110 may serve as a gate insulation layer and/or a protection layer of the LCD device.

Figure 4B:
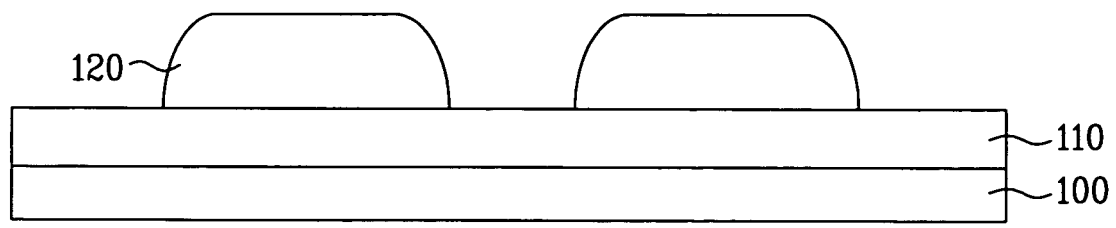

After that, as shown in FIG. 4B, resist layers 120 are deposited on the insulation layer 110 and patterned in a predetermined shape. The resist layers 120 are preferably patterned with a photoresist material capable of reacting with light by an exposure process.

Figure 4C:
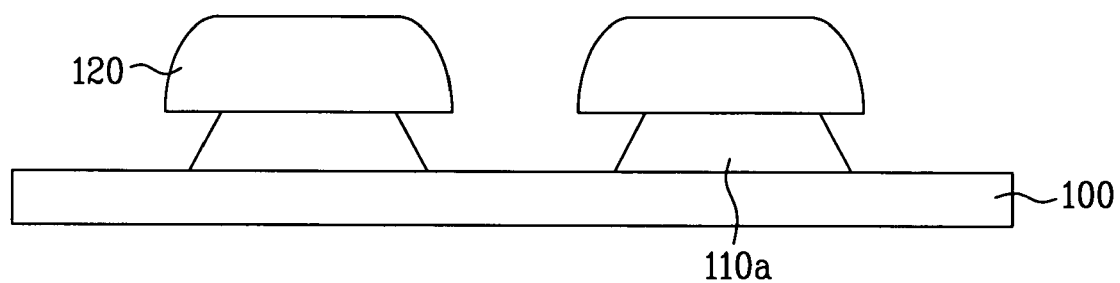

Then, as shown in FIG. 4C, the patterned resist layers 120 are utilized as masks to etch the insulation layer 110, thereby forming insulation layer patterns 110a respectively having a tapered edge. The insulation layer patterns 110a having the tapered edges may be formed by wet etching or dry etching. Specifically, since etching liquid has a property of permeating lower sides of the masks, during the wet etching, the etching liquid permeates lower sides of the resist layers 120 such that the insulation layer patterns 110a are etched to have the tapered edges. Similarly, during the dry etching, etching gas is injected at an angle so that the insulation layer patterns 110a are etched to have the tapered edges.

Figure 4D:
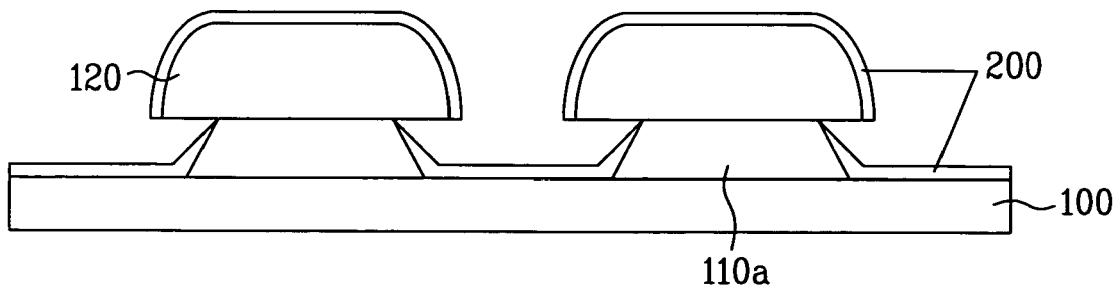

After that, as shown in FIG. 4D, an electrode layer 200 for a common electrode and a pixel electrode is formed on exposed surfaces of the substrate 100, the tapered edges of the insulation layer patterns 110a and the resist layers 120. A transparent metal such as ITO or an opaque metal such as Mo, Ti may be utilized as a material for the electrode layer 200. The electrode layer 200 may be formed on the exposed surfaces of the substrate 100 and the upper sides of the resist layers 120 by vapor-deposition or sputtering under a normal condition. Also, the electrode layer 200 may be formed on the tapered edges of the insulation layer patterns 110a by slightly modifying the normal condition. For example, when a pressure is set higher than that under the normal condition during the vapor-deposition, the material for the electrode layer 200 to be deposited may be changed obliquely due to the pressure, thereby forming the electrode layer 200 on the tapered edges.

Figure 4E:
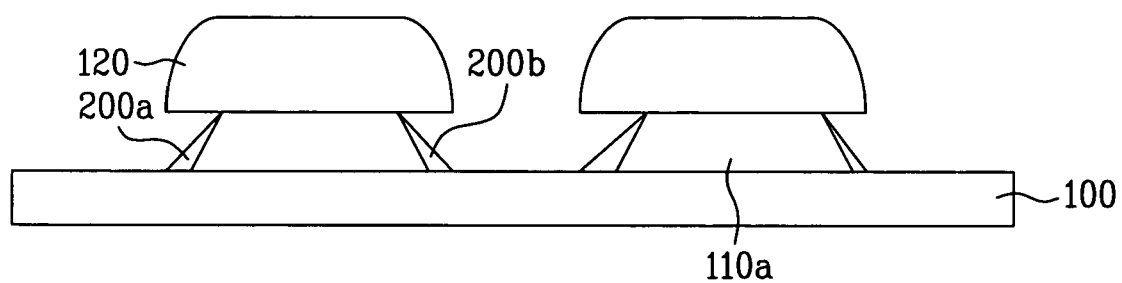

After that, as shown in FIG. 4E, the electrode layer 200 deposited on the exposed surfaces of the substrate 100 and the upper sides of the resist layers 120 is etched, thereby forming electrode layers 200a and 200b on the tapered edges of the insulation layer patterns 110a. The above-described process may be carried out by dry etching in which the etching gas is injected vertically. When the etching gas is injected vertically, the electrode layer 200 formed on the exposed surfaces of the substrate 100 and the upper sides of the resist layers 120 are etched. Since the resist layers 120 serve as masks, the electrode layers 200a and 200b formed on the tapered edges of the insulation layer patterns 110a are not etched but remain.

Figure 4F:
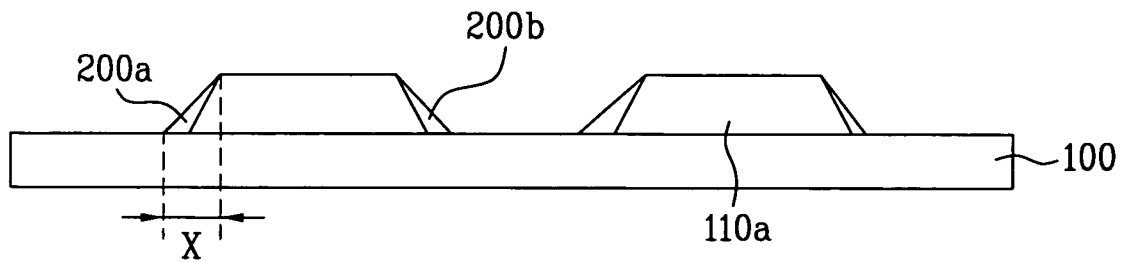

After that, as shown in FIG. 4F, the resist layers 120 are removed to complete the formation of the common electrode 200a and the pixel electrode 200b. The common electrode 200a and the pixel electrode 200b are respectively formed on the tapered edges of the insulation layer patterns 110a to have cross-sections with predetermined slopes, and are arranged parallel to each other in one plane to generate a horizontal directional electric field therebetween. In this exemplary embodiment, the common electrode 200a and the pixel electrode 200b each have a width X as shown in FIG. 4F, which may be formed to be less than 1 µm by the process as shown in FIGS. 4A to 4F. Thus, the aperture ratio is remarkably increased.

As described above, FIGS. 4A to 4F illustrate only the process of forming the pixel electrode and the common electrode within unit pixel regions. Gate lines and data lines crossing each other are formed in the unit pixel regions, and thin film transistors are formed in the crossing regions of the gate lines and the data lines. The gate lines, the data lines, and the thin film transistors may be formed by various methods known in the art of the present invention. Moreover, the IPS mode LCD device according to the exemplary embodiment may be formed by disposing the liquid crystal layer between the upper and lower substrates and bonding the two substrates. At this time, the upper substrate may be manufactured by sequentially forming a light shielding layer, a red color filter layer, a blue color layer, and a green color layer. Also, one of the two substrates may be formed with a spacer for maintaining a cell gap of the LCD device. At least one of the substrates may be further formed with an orientation film for the purpose of an initial orientation of the liquid crystal. The orientation film may be formed by the rubbing alignment using a compound of polyamide or polyimide, polyvinyl alcohol (PVA), polyamic acid, and the like, or by the photo-alignment using a photo-reactive material such as a polyvinyl cinnamate (PVCN) compound, a polysiloxane cinnamate PSCN) compound, a cellulose cinnamate (CelCL) compound, and the like.

There are a vacuum injection method and a dropping method for forming the liquid crystal layer between the substrates. The vacuum injection method is a method of bonding the substrates and injecting the liquid crystal through an injection port, whereas the dropping method is a method of dropping the liquid crystal on any one of the substrates and bonding the substrates. If the substrates are big in size, since it takes a long time to inject the liquid crystal by the vacuum injection and the productivity is deteriorated, the dropping method is preferable.

FIGS. 5A to 5G are sectional views schematically illustrating a manufacturing process of an IPS mode LCD device according to a second exemplary embodiment of the present invention. This second exemplary embodiment only illustrates the process of forming the pixel electrode and the common electrode within unit pixel regions of the IPS mode LCD device. Other elements may be applied by various methods known in the art of the present invention and modifications thereof.

Figure 5A:
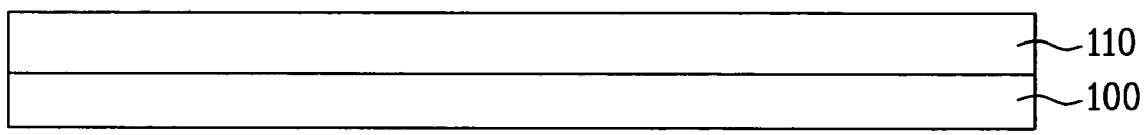
FIGS. 5A to 5G are sectional views schematically illustrating a manufacturing process of an IPS mode LCD device according to a second exemplary embodiment of the present invention.
Figure 5B:
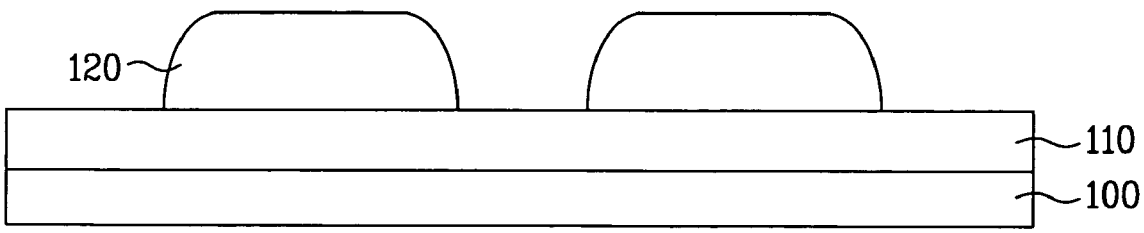
Figure 5C:
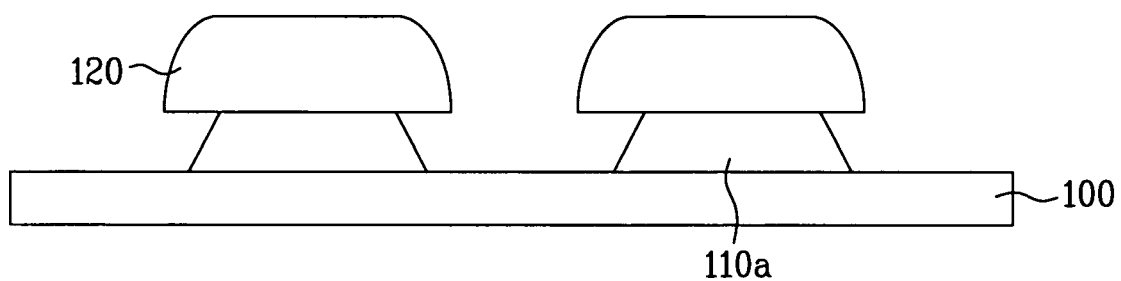
Figure 5D:
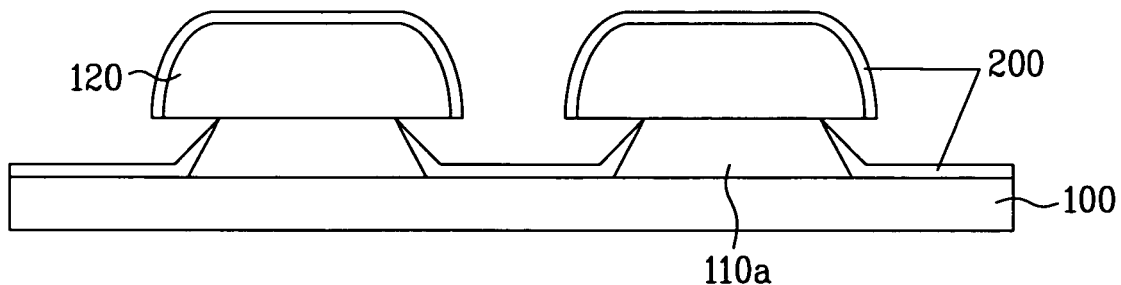
Figure 5E:
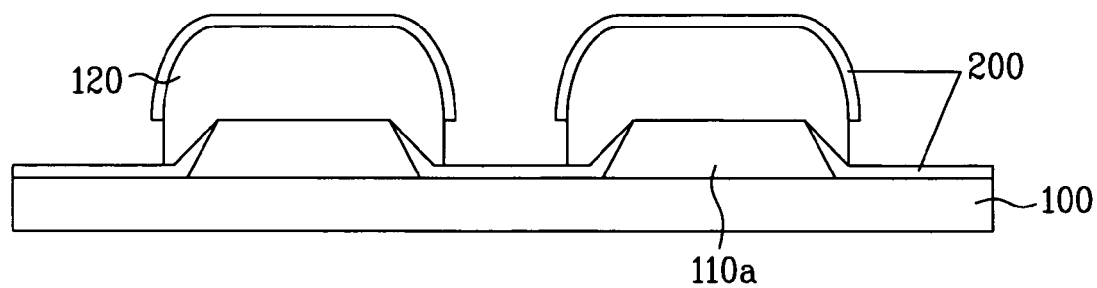

The second exemplary embodiment is similar to the first exemplary embodiment except for an added process as shown in FIG. 5E. Thus, like references are assigned to like elements, and the method according to the second exemplary embodiment of the present invention will be described with reference to FIGS. 5A to 5G.

As shown in FIG. 5A, a substrate 100 is prepared and an insulation layer 110 is formed on the substrate 100. Then, as shown in FIG. 5B, resist layers 120 are deposited and patterned on the insulation layer 110 in a predetermined shape. After that, as shown in FIG. 5C, the patterned resist layers 120 are utilized as masks to etch the insulation layer 110 so as to form insulation layer patterns 110a with tapered edges. As shown in FIG. 5D, an electrode layer 200 for a common electrode and a pixel electrode is formed on the exposed surfaces of the substrate 100, the tapered edges of the insulation layer patterns 110a and the resist layers 120. Since the description of the respective processes is identical to that of the first exemplary embodiment of the present invention, such a description is omitted.

After that, as shown in FIG. 5E, thermal treatment is applied to the resist layers 120 to flow the resist layers 120, thereby forming the resist layers 120 on the upper sides of the tapered edges of the insulation layer patterns 110a. If the resist layers 120 can flow, the thermal treatment is satisfied and is adjusted according to material properties of the resist layers 120.

Figure 5F:
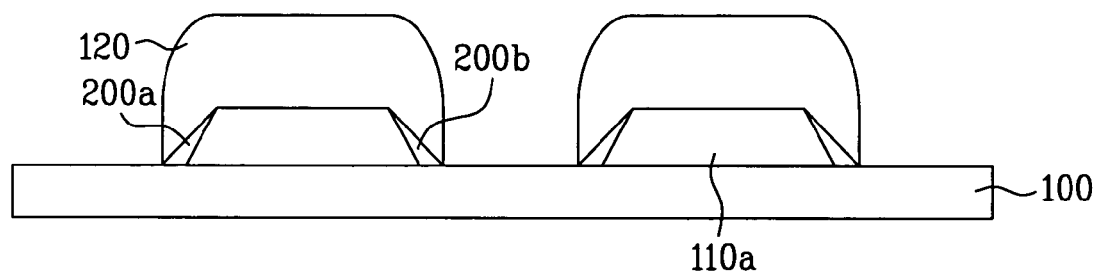
Figure 5G:
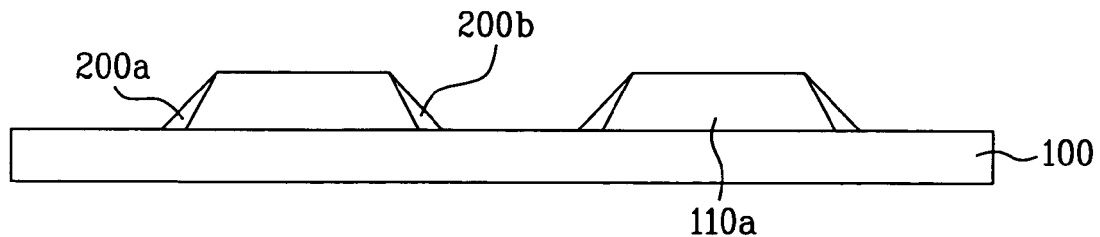

Then, as shown in FIG. 5F, the electrode layer 200 deposited on the exposed surfaces of the substrate 100 and the upper sides of the resist layers 120 is etched, thereby forming electrode layers 200a and 200b on the tapered edges of the insulation layer patterns 110a. Next, as shown in FIG. 5G, the resist layers 120 are removed to complete the formation of the common electrode 200a and the pixel electrode 200b.

In addition, the IPS mode LCD device is formed by interposing the liquid crystal layer between a lower substrate and an upper substrate and bonding the two substrates. The lower substrate is provided with gate lines and data lines crossing each other in the unit pixel regions and thin film transistors formed in the crossing regions of the gate lines and the data lines. The upper substrate is manufactured by forming a light shielding layer and color filter layers. These descriptions are identical to the above description.

Figure 6:
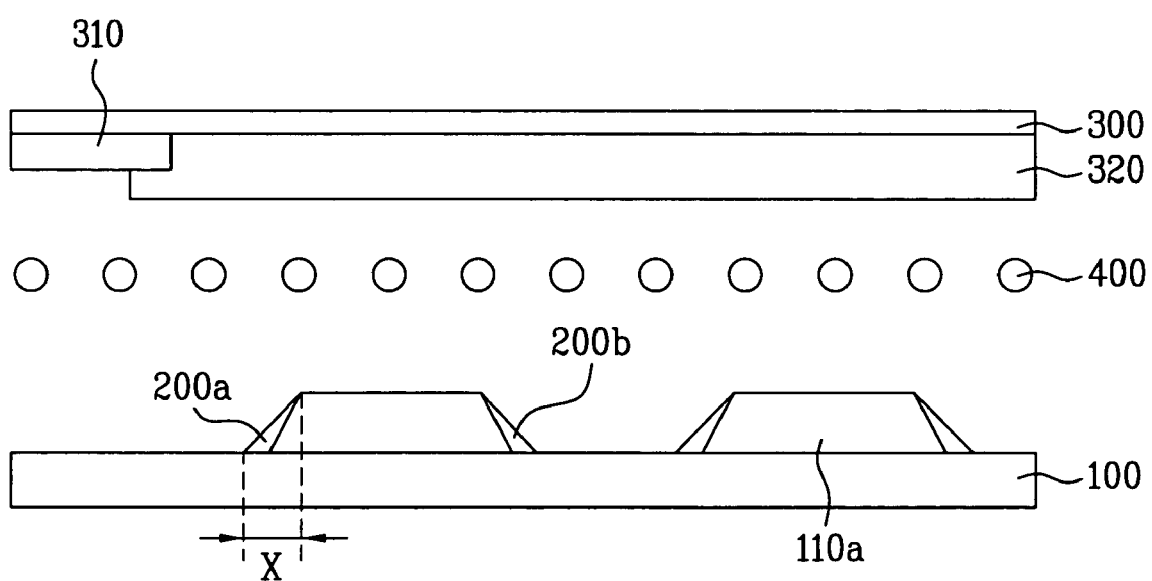
FIG. 6 is a sectional view schematically illustrating an IPS mode LCD device according to a third exemplary embodiment of the present invention.

FIG. 6 is a sectional view schematically illustrating an IPS mode LCD device according to a third exemplary embodiment of the present invention. The third exemplary embodiment illustrates only a pixel electrode and a common electrode within unit pixel regions of the IPS mode LCD device.

As shown in FIG. 6, the IPS mode LCD device according to the third exemplary embodiment includes a first substrate 100, a second substrate 300, and a liquid crystal layer 400 formed between the first and second substrates 100 and 300. On the first substrate 100, insulation layer patterns 110a having tapered edges are formed. On the respective cross-sections of the tapered edges of the insulation layer patterns 110a, a common electrode 200a and the pixel electrode 200b are respectively formed to have cross-sections with predetermined slopes, and are arranged parallel to each other in one plane. A transparent metal such as ITO or opaque metal such as Mo, Ti, and the like may be utilized as a material for the common electrode 200a and the pixel electrode 200b. Moreover, the common electrode 200a and the pixel electrode 200b each have a width X of less than 1 μm. On the second substrate 300, a light shielding layer 310 and a color filter layer 320 are formed.

Although not shown in the drawings, on the first substrate 100, gate lines and data lines cross each other to define pixel regions, and thin film transistors are formed in the crossing regions of the gate lines and the data lines. The substrates 100 and 300 may be sealed by sealing material, and a spacer may be formed between the first and second substrates 100 and 300 to maintain a cell gap of the LCD device. The spacer may be a ball-shaped spacer or a column-shaped spacer. Moreover, at least one of the first and second substrates 100 and 300 may be further formed with an orientation film for the purpose of an initial orientation of the liquid crystal.

Although not described in detail, various elements other than the common electrode 200a and the pixel electrode 200b as core of the present invention may be modified by various methods known in the art of the present invention.

According to the exemplary embodiments of the present invention, since the common electrode and the pixel electrode can be formed with a width of less than 1 μm, the aperture ratio is remarkably increased and transmittance is also increased.

It will be apparent to those skilled in the art that various modifications and variations can be made in the In-Plane Switching (IPS) mode LCD device and the method of manufacturing the same of the present invention without departing from the spirit or scope of the inventions. Thus, it is intended that the present invention covers the modifications and variations of this invention provided they come within the scope of the appended claims and their equivalents.

What is claimed is:

1. A method of manufacturing an in-plane switching mode liquid crystal display device, comprising:
    forming an insulation layer on a substrate;
    depositing a resist layer on the insulation layer to pattern the resist layer with a predetermined shape;
    etching the insulation layer using the patterned resist layer as a mask to form an insulation layer pattern having tapered edges;
    forming electrode layers for a common electrode and a pixel electrode on exposed surfaces of the substrate, the tapered edges of the insulation layer pattern, and an upper side of the resist layer;
    etching the electrode layers formed on the exposed surfaces of the substrate and the upper side of the resist layer; and
    removing the resist layer to form the common electrode and the pixel electrode on the tapered edges of the insulation layer pattern, wherein the common electrode and the pixel electrode have predetermined slopes, respectively, and are arranged parallel to each other.

2. The method according to claim 1, further comprising, between forming the electrode layers and etching the electrode layers, performing thermal treatment to the resist layer to flow the resist layer, thereby forming the resist layer on the tapered edges of the insulation layer pattern.

3. The method according to claim 1, wherein etching the insulation layer is carried out by wet etching using etching liquid.

4. The method according to claim 1, wherein etching the insulation layer is carried out by dry etching using etching gas, which is obliquely injected.

5. The method according to claim 1, wherein etching the insulation layer is carried out by dry etching using etching gas, which is vertically injected.

6. The method according to claim 1, further comprising:
    forming gate lines and data lines crossing each other on the substrate; and
    forming thin film transistors in crossing regions of the gate lines and the data lines.

7. The method according to claim 1, further comprising:

preparing an opposite substrate facing the substrate, the opposite substrate being provided with a light shielding layer and color filter layers; and forming a liquid crystal layer between the substrate and the opposite substrate.

8. The method according to claim 7, wherein forming the liquid crystal layer comprises:

dropping the liquid crystal layer on at least one of the substrate and the opposite substrate; and bonding the substrate and the opposite substrate.

9. An in-plane switching (IPS) mode liquid crystal display (LCD) device comprising:

a first substrate and a second substrate facing each other and respectively having pixel regions;

a liquid crystal layer formed between the first and second substrates;

an insulation layer formed in the pixel regions of the first substrate and including tapered sides;

a common electrode formed on one side of the tapered sides of the insulation layer; and a pixel electrode formed on the other side of the tapered sides of the insulation layer, and wherein the common electrode and the pixel electrode have predetermined slopes.

10. The IPS mode LCD device according to claim 9, wherein the common electrode and the pixel electrode are made of one material of transparent metal and opaque metal.

11. The IPS mode LCD device according to claim 9, wherein the common electrode and the pixel electrode each have a width that is less than 1 µm.

12. The IPS mode LCD device according to claim 9, further comprising:

gate lines and data lines formed on the first substrate and crossing each other; and thin film transistors formed in crossing regions of the gate lines and the data lines.

13. The IPS mode LCD device according to claim 9, wherein the second substrate includes a light shielding layer and color filter layers formed thereon.

14. The IPS mode LCD device according to claim 9, further comprising a spacer arranged between the first substrate and the second substrate to maintain a cell gap.

* * * * *